United States Patent
Liu et al.

(10) Patent No.: US 11,968,031 B2
(45) Date of Patent: Apr. 23, 2024

(54) CELL INFORMATION ACQUISITION METHOD AND APPARATUS

(71) Applicant: ZTE Corporation, Guangdong (CN)

(72) Inventors: Jing Liu, Guangdong (CN); He Huang, Guangdong (CN)

(73) Assignee: ZTE Corporation, Shenzhen (CN)

( * ) Notice: Subject to any disclaimer, the term of this patent is extended or adjusted under 35 U.S.C. 154(b) by 219 days.

(21) Appl. No.: 17/184,846

(22) Filed: Feb. 25, 2021

(65) Prior Publication Data
US 2021/0184782 A1 Jun. 17, 2021

Related U.S. Application Data (63) Continuation of application No. 16/939,955, filed on Jul. 27, 2020, now Pat. No. 10,951,341, which is a (Continued)

(51) Int. Cl.
*H04J 11/00* (2006.01)
*H04W 24/10* (2009.01)

(52) U.S. Cl.
CPC ......... *H04J 11/0069* (2013.01); *H04W 24/10* (2013.01); *H04J 2211/003* (2013.01)

(58) Field of Classification Search
CPC .......... H04J 11/0069; H04J 2211/003; H04W 24/10; H04W 48/16; H04W 56/0015; H04W 48/10
See application file for complete search history.

(56) References Cited

U.S. PATENT DOCUMENTS

| | | | |
|---|---|---|---|
| 9,191,890 B2 | 11/2015 | Jafarian et al. | |
| 9,357,446 B2 | 5/2016 | Kim et al. | |
| (Continued) | | | |

FOREIGN PATENT DOCUMENTS

| | | |
|---|---|---|
| CN | 101601206 A | 12/2009 |
| CN | 102404689 A | 4/2012 |
| (Continued) | | |

OTHER PUBLICATIONS

Office Action for Canadian Patent Application No. 3,089,912, dated Sep. 7, 2021 (4 pages).

(Continued)

*Primary Examiner* — Mazda Sabouri
(74) *Attorney, Agent, or Firm* — Perkins Coie LLP (57) ABSTRACT

Disclosed are methods, apparatus and systems for cell information acquisition and reporting. One method includes receiving a request for configuration information and a synchronization block, determining that the synchronization block is not associated with the configuration information, and transmitting a failure indication in response to the request. Another method includes receiving a request for configuration information and a first synchronization block, determining that the first synchronization block is not associated with the configuration information, and the first synchronization block comprises information related to a second synchronization block that is associated with the configuration information, and determining whether a radio frequency retuning operation can be performed in order to obtain the configuration information.

20 Claims, 8 Drawing Sheets

Related U.S. Application Data continuation of application No. PCT/CN2018/076723, filed on Feb. 13, 2018.

(56) References Cited

U.S. PATENT DOCUMENTS

| | | | |
|---|---|---|---|
| 2012/0142356 | A1 | 6/2012 | Serravalle et al. |
| 2015/0271864 | A1 | 9/2015 | Nigam et al. |
| 2017/0215133 | A1 | 7/2017 | Yang et al. |
| 2018/0359714 | A1 | 12/2018 | Sadiq et al. |
| 2019/0363809 | A1 | 11/2019 | Yoon et al. |
| 2020/0162182 | A1 | 5/2020 | Zhang |
| 2020/0178148 | A1* | 6/2020 | Lee ................. H04W 24/10 |
| 2020/0228275 | A1 | 7/2020 | Li et al. |
| 2020/0260392 | A1 | 8/2020 | Tang |
| 2020/0336955 | A1* | 10/2020 | Bao ................. H04W 36/0072 |
| 2020/0358547 | A1 | 11/2020 | Liu et al. |
| 2021/0153083 | A1* | 5/2021 | Moosavi ......... H04W 36/0061 |
| 2021/0297916 | A1* | 9/2021 | Futaki ............. H04W 36/14 |
| 2022/0030534 | A1* | 1/2022 | Soldati ............ H04W 56/0015 |

FOREIGN PATENT DOCUMENTS

| | | |
|---|---|---|
| CN | 106789800 A | 5/2017 |
| CN | 106797611 A | 5/2017 |
| CN | 107079403 A | 8/2017 |
| CN | 107278383 A | 10/2017 |
| EP | 3113536 A1 | 1/2017 |
| EP | 4009574 A1 | 6/2022 |
| JP | 2013-502749 A | 1/2013 |
| KR | 10-2015-0098622 A | 8/2015 |
| KR | 10-2020-0116987 A | 10/2020 |
| WO | 2016/130175 A1 | 8/2016 |
| WO | 2017/217898 A1 | 12/2017 |
| WO | 2019/140628 A1 | 7/2019 |

OTHER PUBLICATIONS

NTT DOCOMO, Inc., "Remaining issues on NR-PBCH," 3GPP TSG RAN WG1 Meeting AH 1801, Vancouver, Canada, R1-1800650, 9 pages, Jan. 2018.
Office Action for Japanese Patent Application No. 2020-542257, dated Oct. 19, 2021 (9 pages).
First Examination Report for Indian Patent Application No. 202047036405, dated Feb. 3, 2022 (6 pages).
Nokia et al., "Remaining details on NR-PBCH," 3GPP TSG-RAN WG1 NR AH #18-01, Vancouver, Canada, R1-1800803, Jan. 2018 (6 pages).
Intel Corporation, "Remaining Details of NR PBCH," 3GPP TSG RAN WG1 Meeting 2018 Ad-hoc #1, Vancouver, Canada, R1-1800297, Jan. 2018 (4 pages).
Notice of Allowance for Korean Patent Application No. 10-2020-7025529, dated Jan. 4, 2022 (6 pages).
NTT DOCOMO, Inc., "Remaining issues on NR-PBCH," 3GPP TSG RAN WG1 Meeting AH 1801, Vancouver, Canada, R1-1800650, Jan. 2018 (7 pages).
Office Action for Korean Patent Application No. 10-2020-7025529, dated Jul. 19, 2021 (with English summary) (7 pages).
Office Action for Japanese Patent Application No. 2020-542257, dated May 10, 2022 (4 pages).
International Search Report and Written Opinion dated Oct. 31, 2018 for International Application No. PCT/CN2018/076723, filed on Feb. 13, 2018 (10 pages).
Extended European Search Report for European Patent Application No. 18906275.5, dated Feb. 2, 2021.
Oppo, "Remaining Details of NR PBCH contents," 3GPP TSG RAN WG1 Meeting #91 Reno, Nevada, R1-1720002, Dec. 2017.
CATT, "On Remaining details on RMSI," 3GPP TSG-RAN WG1 Meeting #91, Reno, Nevada, USA, R1-1720170, 20 pages, Dec. 2017.
Ericsson, "Anr framework in NR," 3GPP TSG RAN WG2 #100, Reno, Nevada, R2-1713594, Nov. 27-Dec. 1, 2017 (4 Pages).
ZTE Corporation et al., "Consideration on ReportCGI measurement," 3GPP TSG RAN WG2 #101, Athens, Greece, R2-1802024, Feb. 26-Mar. 2, 2018, 3 pages.
Notice of Allowance for Japanese Patent Application No. 2020-542257, dated Nov. 8, 2022 (4 pages).
Extended European Search Report for European Patent Application No. 23177291.4, dated Oct. 11, 2023 (11 pages).
Huawei, "Support of Inbound Handover for Legacy Mobile," 3GPP TSG-RAN WG3#64, R3-091086, San Francisco, USA, May 4-8, 2009 (3 pages).
Ericsson, "ANR framework for EN-DC and NR standalone," 3GPP TSG-RAN WG2 NR-Ah#1801, Tdoc R2-1801311 (Resubmission of R2-1713594), Vancouver, Canada, Jan. 22-26, 2018 (4 pages).
3GPP, "3rd Generation Partnership Project Technical Specification Group Radio Access Network NR Radio Resource Control (RRC) Protocol specification (Release 15)," 3GPP TS 38.331 V0.4.0 (Dec. 2017) (196 pages).
Qualcomm, "WF on RMSI presence flag," 3GPP TSG RAN WG1 #91, R1-1721684, Reno, U.S.A., Nov. 27-Dec. 1, 2017, Agenda item 7.1.2.1 (5 pages).
Huawei et al., "Automatic Neighbour Relation in NR," 3GPP TSG-RAN WG2 NR Ad Hoc, R2-1706747, Qingdao, China, Jun. 27-29, 2017 (4 pages).
Communication under Rule 71(3) for European Patent Application No. 18906275.5, dated Feb. 2, 2023 (9 bages).

* cited by examiner

CELL INFORMATION ACQUISITION METHOD AND APPARATUS

CROSS REFERENCE TO RELATED APPLICATIONS

This patent document is a continuation of and claims benefit of priority to U.S. patent application Ser. No. 16/939,955, filed Jul. 27, 2020, which is a continuation of and claims benefit of priority to International Patent Application No. PCT/CN2018/076723, filed on Feb. 13, 2018. The entire content of the before-mentioned patent applications is incorporated by reference as part of the disclosure of this application.

TECHNICAL FIELD

This document is directed generally to wireless communications.

BACKGROUND

Wireless communication technologies are moving the world toward an increasingly connected and networked society. The rapid growth of wireless communications and advances in technology has led to greater demand for capacity and connectivity. Other aspects, such as energy consumption, device cost, spectral efficiency, and latency are also important to meeting the needs of various communication scenarios. In comparison with the existing wireless networks, next generation systems and wireless communication techniques need to provide more efficient serving cell and neighbor cell management and huge number of connections.

SUMMARY

This document relates to methods, systems, and devices for efficient cell management and cell information acquisition and reporting in Long Term Evolution (LTE) and New Radio (NR) systems.

In one exemplary aspect, a wireless communication method is disclosed. The method, which may be implemented at a wireless device, includes receiving (a) a request for configuration information and (b) a synchronization block, determining that the synchronization block is not associated with the configuration information, and transmitting a failure indication in response to the request for configuration information.

In another exemplary aspect, a wireless communication method is disclosed. The method, which may be implemented at a wireless device, includes receiving (a) a request for configuration information and (b) a first synchronization block, determining that (a) the first synchronization block is not associated with the configuration information, and (b) the first synchronization block comprises information related to a second synchronization block that is associated with the configuration information, and determining whether a radio frequency retuning operation can be performed in order to obtain the configuration information.

In yet another exemplary aspect, a wireless communication method is disclosed. The method, which may be implemented at a wireless device, includes receiving a request for (a) a cell information for a target cell, and (b) a timing difference information between a serving cell and the target cell, and determining whether the request comprises identification information for the target cell.

In yet another exemplary aspect, a wireless communication method is disclosed. The method, which may be implemented at a network node, includes receiving a timing difference information between the serving cell and a target cell, adjusting a timing configuration information based on the timing difference information, and transmitting the timing configuration information after the adjusting.

In yet another exemplary aspect, the above-described methods are embodied in the form of processor-executable code and stored in a computer-readable program medium.

In yet another exemplary embodiment, a device that is configured or operable to perform the above-described methods is disclosed.

The above and other aspects and their implementations are described in greater detail in the drawings, the descriptions, and the claims.

DETAILED DESCRIPTION

In cellular mobile communication systems, in order to relieve an operator from the burden of manually managing neighbor relations, an ANR (Automatic Neighbor Relation) function is introduced. In an example, the ANR function in an LTE (Long Term Evolution) system may be primarily configured to obtain the ECGI (E-UTRAN Cell Global Identifier) of an unknown neighbor cell. This ANR procedure may include the following steps:

(1) A UE, which is connected with Cell A, sends a measurement report regarding Cell B. This report includes Cell B's PCI (Physical Cell Identifier), but not its ECGI;

(2) Assuming that Cell B is not a neighbor cell of Cell A, Cell A may transmit a measurement configuration (or request) to the UE to report the ECGI of Cell B, providing the requested PCI and frequency information, and setting the measurement purpose of the report to ReportCGI; and (3) When the UE receives the measurement configuration, the UE may read the ECGI from the broadcast channel of the indicated neighbor cell, and send the corresponding information to network by sending a measurement report, and within this message, the UE may include ECGI, TAC (Tracking Area Code), and all PLMN (Public Land Mobile Network) IDs.

In the New Radio (NR) system, the ANR function is introduced for both non-standalone and standalone scenarios. For the non-standalone scenario, UE is connected to both LTE and NR system, and UE may be configured to report the CGI (Cell Global Identifier) of an unknown NR cell. For the standalone scenario, UE is only connected to NR system, and may be configured to report the CGI of an unknown NR cell as well.

Overview and Terminology

An NR system is configured so as to be able to support multiple synchronization signal/physical broadcast channel blocks (SSBs). A shown in FIG. 1, an SSB includes at least three parts: (1) the Primary Synchronization Signal (PSS), (2) the Secondary Synchronization Signal (SSS), and (3) the primary broadcast channel (PBCH). In certain scenarios, the PSS and SSS may be collectively referred to as "synchronization signals."

In an example, the PBCH includes the Master Information Block (MIB) that contains several information elements (IEs). Examples of IEs include a System Frame Number (SFN), scheduling information of remaining minimum system information (RMSI) and the scheduling information of other SSBs.

In an example, the RMSI is a type of system information (e.g. system information block 1, or SIB1) which includes the information required to access a cell, e.g. CGI, TAC, PLMN ID, SSB resource timing configuration, etc. When a network transmits a ReportCGI measurement, one of the primary purposes is to obtain information regarding RMSI.

Figure 1:
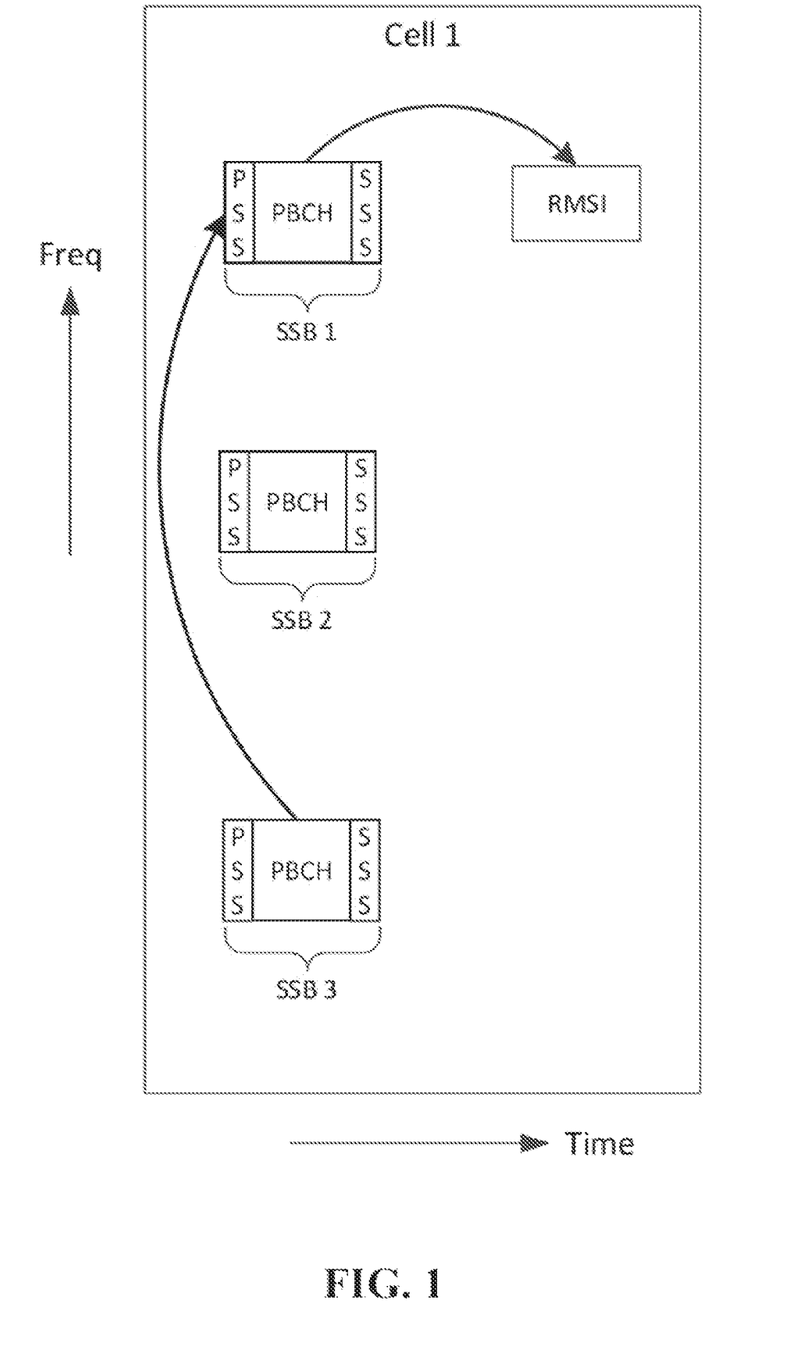
FIG. 1 shows an example of the different types of synchronization signal/physical broadcast channel blocks (SSBs) in a New Radio (NR) cell.

As shown in FIG. 1, there are at least three types of SSBs:
(1) A normal SSB, e.g. SSB1, is associated with RMSI. Herein, the content of the PBCH in SSB1 includes scheduling information of RMSI. If SSB1 is received by UE, it may decode the PBCH, obtain at least a time and frequency position of RMSI, and may subsequently receive and decode RMSI to obtain the required information.
(2) A SSB not associated with RMSI, e.g. SSB2. Herein, the content of the PBCH in SSB2 does not contain scheduling information of RMSI. UE that receives SSB2 and decodes its PBCH may not have the necessary scheduling information for RMSI.
(3) A SSB not associated with RMSI but indicating a position of another SSB, e.g. SSB3. Herein, SSB3 is not associated with RMSI, but the content of the PBCH includes the scheduling information of another SSB that is associated with RMSI. When UE receives SSB3 and decodes the content of PBCH, UE may retune to SSB1, decodes the content of PBCH in SSB1 to get the scheduling information of RMSI, and then receive the RMSI.

Exemplary Embodiments of Existing Systems

In an LTE system, ECGI is broadcast in system information, which is transmitted with a fixed period, and UE can obtain the relevant system information after UE synchronizes to the cell, since the PSS (Primary Synchronous Signal) and SSS (Secondary Synchronous Signal) are transmitted on the cell center frequency. When the network indicates the frequency and PCI to UE, the UE is able to search and decode the relevant system information to obtain the ECGI.

In an NR system, and in contrast to an LTE system, the PSS, SSS and PBCH are transmitted via SSB (Synchronization signal/PBCH block, or SS/PBCH block), and the SSB may be transmitted at any frequency within the cell. In certain scenarios, multiple SSB may be transmitted, and wideband cells may transmit more than one SSBs at different frequencies.

In an NR system, the CGI information is included in RMSI (Remain minimum system information), and the RMSI may include at least SIB1 (System information block 1). In a deployment, each SSB may or may not associate with RMSI. Since UE can perform measurement based on SSB, UE might report a PCI of an unknown cell based on the SSB that is not associated with RMSI. If the network configures UE to report CGI of PCI on this frequency of SSB, then reporting CGI may fail since UE is unable to decode the RMSI.

The current specification (or standard) does not enable UE to indicate a reason for failure to the network. Thus, from the perspective of the network, the failure may have occurred due to poor cell quality, and may result in the network configuring other UEs to report CGI for the same cell, which may continually result in failure.

In addition, and based on the characteristics of an NR SSB resource, if UE is required to measure on NR cell, then the network should indicate the SMTC (SSB measurement timing configuration) of measured frequency to UE, which may include duration, period, offset of the measured window, as well as the SSB transmission bitmap.

In the current specification, the network may obtain the SMTC of neighbor cells (also referred to as target cells) through an X2/Xn interface. However, if the serving cell configures UE to measure on the neighbor cells on that frequency, UE may perform a SMTC window calculation based on the timing of serving cell. In the case of asynchronous deployment, for the unknown neighbor cells of a given frequency, if the serving cell cannot predict the timing difference between serving cell and neighbor cell, then serving cell is unable to adjust the SMTC of neighbor cell when configuring the measurement. For normal measurements other than reportCGI, UEs are unable to detect the cells by configuring the wrong SMTC configuration.

In an LTE system, when the ANR function is enabled in network, the network may obtain the PCI of unknown neighbor cells from the UE measurement report, and the network can trigger any UE to report the ECGI of that cell through reportCGI measurement. Upon receiving this measurement configuration, UE may start a timer (whose duration may be specified in the standard or specification). Before the timer expires, UE may attempt to search the target cell and decode the system information of the target cell to obtain the ECGI and other cell information such as PLMN IDs, TAC, etc. If UE succeeds, UE sends a measurement report message to network that includes these information. If UE fails and the timer expires, UE may also send a measurement report message to network but without the cell information included, and network may become aware of the failure based on the content of measurement report message. Then, the network may select other UEs to trigger the same procedure towards this unknown PCI.

In an LTE system, PSS/SSS are located in the center frequency of cell, and upon receiving the frequency and PCI of target cell, UE is capable of searching the target cell, and obtaining the relevant system information of target cell.

In an NR system, the cell information is included in RMSI, which is also a kind of system information, that is broadcast in the NR cell. The PSS, SSS and PBCH are transmitted within a SSB, which can be transmitted on the frequency different from the center frequency of NR cell. When UE is required to acquire the CGI of a given NR cell, UE should first synchronize to the target cell based on SSB, decode the PBCH to obtain the transmission information of RMSI, and then receive and decode the RMSI to get the cell information, such as CGI, TAC and PLMN IDs, etc.

Figure 2:
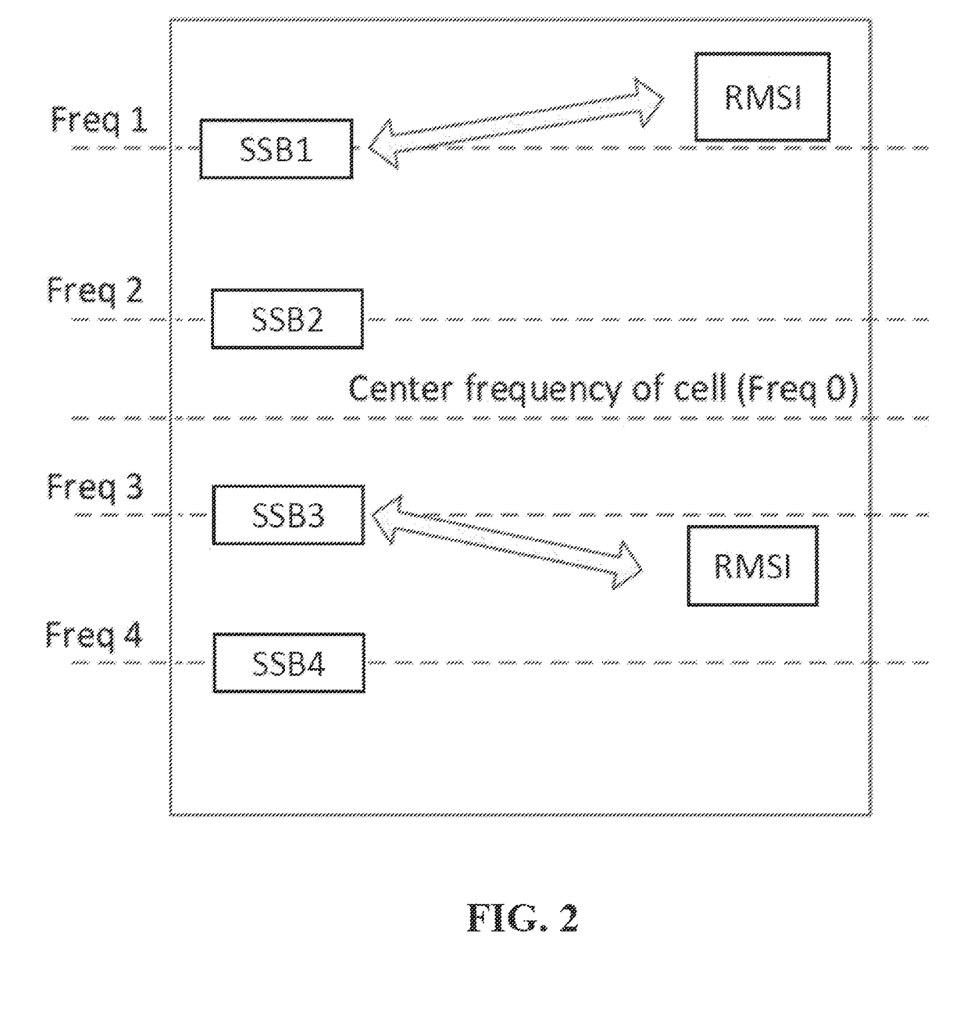
FIG. 2 shows an example of a New Radio (NR) cell configured with multiple synchronization signal/physical broadcast channel blocks (SSBs).

In an NR system, the SSB may be flexibly configured to associate with RMSI or not associate with RMSI. In Example (1), a non-standalone NR cell may only be treated as a secondary cell (SCell), and UEs in an idle state are not permitted to perform initial access to this cell. In this case, the SSB may be configured to perform measurements but without being associated to any RMSI. In Example (2), and as shown in FIG. 2, an NR cell may be configured with multiple SSBs. The multiple SSBs may be transmitted on different frequencies, where some of the SSBs may be associated with RMSI (e.g. SSB1 and SSB3) and some SSBs need not be associated with RMSI (e.g. SSB2 and SSB4).

Additionally, and in the context of Example (2), an SSB not associated with RMSI might indicate another frequency position of an SSB that is associated with RMSI, which would assist UE in performing initial access to the cell.

In an NR system, measurements can be configured based on SSB, and the network can indicate the frequency position of measured SSB in a MeasObject via measurement configuration message sent from network to UE, and an SSB with different frequency may be modeled as a different MeasObject. In this scenario, UE is unaware of whether they belong to the same cell or not.

As seen in the examples described, existing ANR measurement configuration and reporting mechanisms for LTE systems cannot be directly reused in NR systems. Some exemplary cases include (1) UE performing reportCGI on an SSB not associated with RMSI, which may result in failure, (2) supporting a multiple SSB scenario, where different UEs may report same CGI upon different frequencies and PCI, and (3) network difficulty in distinguishing whether the cell information has changed or the cell is a multiple SSB cell.

For the timing difference measurement between serving cell and neighbor (or target) cell, in an LTE system, UE may only support this when UE is operating in LTE DC (dual connectivity) mode, and the timing difference is measured between the primary cell (PCell) and the primary secondary cell (PSCell). In an NR system, although UE is capable of measure timing differences between serving cell and another cell (not PSCell), it does not support this capability for reportCGI measurements.

Figure 3:
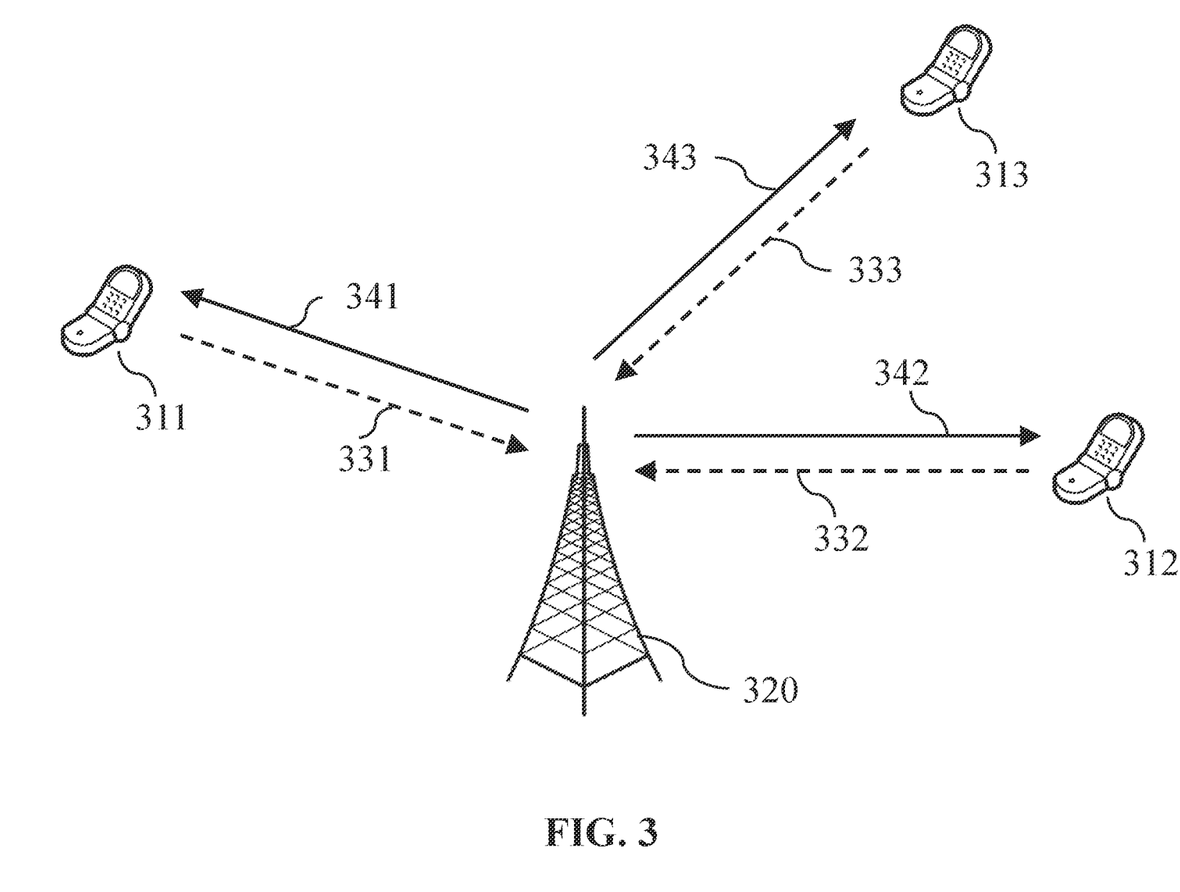
FIG. 3 shows an example of a base station (BS) and user equipment (UE) in wireless communication, in accordance with some embodiments of the presently disclosed technology.

FIG. 3 shows an example of a wireless communication system that includes a base station (BS) 320 and one or more user equipment (UE) 311, 312 and 313. In some embodiments, the base station may transmit a request for configuration information and a synchronization block (341, 342, 343) to the UEs. In response to determining that they are not associated, the UEs may transmit failure indications (331, 332, 333).

First Set of Exemplary Embodiments for Cell Information Acquisition and Reporting When a serving network instructs UE to obtain the cell information of target cell, and the target cell is an NR cell, the network does so by sending a measurement configuration to the UE. The measurement configuration includes the PCI and frequency of target cell, and its measurement purpose is set to indicate that the UE attempt to obtain the cell information of target cell.

In some embodiments, this serving network may be an LTE site (or cell) or an NR site. For the LTE site, UE may be operating in non-standalone mode, in which UE is dual connected to both LTE and NR nodes. For the NR site, UE may be operating in either non-standalone or standalone mode.

Upon receiving the measurement configuration, UE starts a related timer, and attempts to search for the target cell based on the indicated frequency and PCI. After synchronizing with the target cell, the UE may decode the PBCH which is transmitted in an SSB to obtain the scheduling information of RMSI. If the content of PBCH indicates that this SSB is not associated with RMSI, the UE may then report the failure indication to network by including a failure indication in the measurement report message, or by including a specific cause value in the measurement report message. In addition, UE may send the measurement report right after UE successfully decodes the PBCH content, or UE can send the measurement report when the related timer expires.

Case 1. In an example, UE is connected to NR cell A, and the NR serving network instructs the UE to obtain the cell information of target NR cell B. The network sends a measurement configuration to UE, wherein the measurement purpose is set to reportCGI, and which includes the corresponding frequency and PCI of cell B.

Upon receiving the measurement configuration, UE starts a timer, and attempts to search the SSB of target cell B based on the received frequency and PCI of cell B. In the event of a successful search, UE decodes the content of PBCH to obtain the scheduling information of RMSI. If there is no scheduling information of RMSI, which means this SSB is not associated with RMSI, the UE immediately sends the network a measurement report, which includes an explicit indication that the reportCGI procedure has failed due to the indicated SSB of target cell B not being associated with RMSI. In an example, the explicit indication can be one bit (e.g. indicating true or false).

After receiving this measurement report, the network is aware of the reason for failure of this attempt based on the received indication, and may not trigger reportCGI procedure on this frequency and PCI any more.

Case 2. In another example, UE is dual connected to both LTE cell A and NR cell B, and the LTE serving network instructs the UE to obtain the cell information of target NR cell C. The LTE network sends a measurement configuration to UE, with the measurement purpose set to reportCGI, and which includes the correspond frequency and PCI of NR cell C.

Upon receiving the measurement configuration, UE starts a timer, and attempts to search the SSB of target cell C based on the received frequency and PCI of cell C. In the event of a successful search, UE decodes the content of PBCH to obtain the scheduling information of RMSI. If there is no scheduling information of RMSI, which means this SSB is not associated with RMSI, the UE immediately sends a measurement report to the LTE network when the timer expires. The measurement report includes a cause value to notify the network that the reportCGI procedure has failed due to the indicated SSB of target cell B being not associated with RMSI.

After receiving this measurement report, the LTE network is aware of the reason for failure of this attempt based on the received cause value, and may not trigger additional reportCGI procedures on this frequency and PCI any more.

Figure 4:
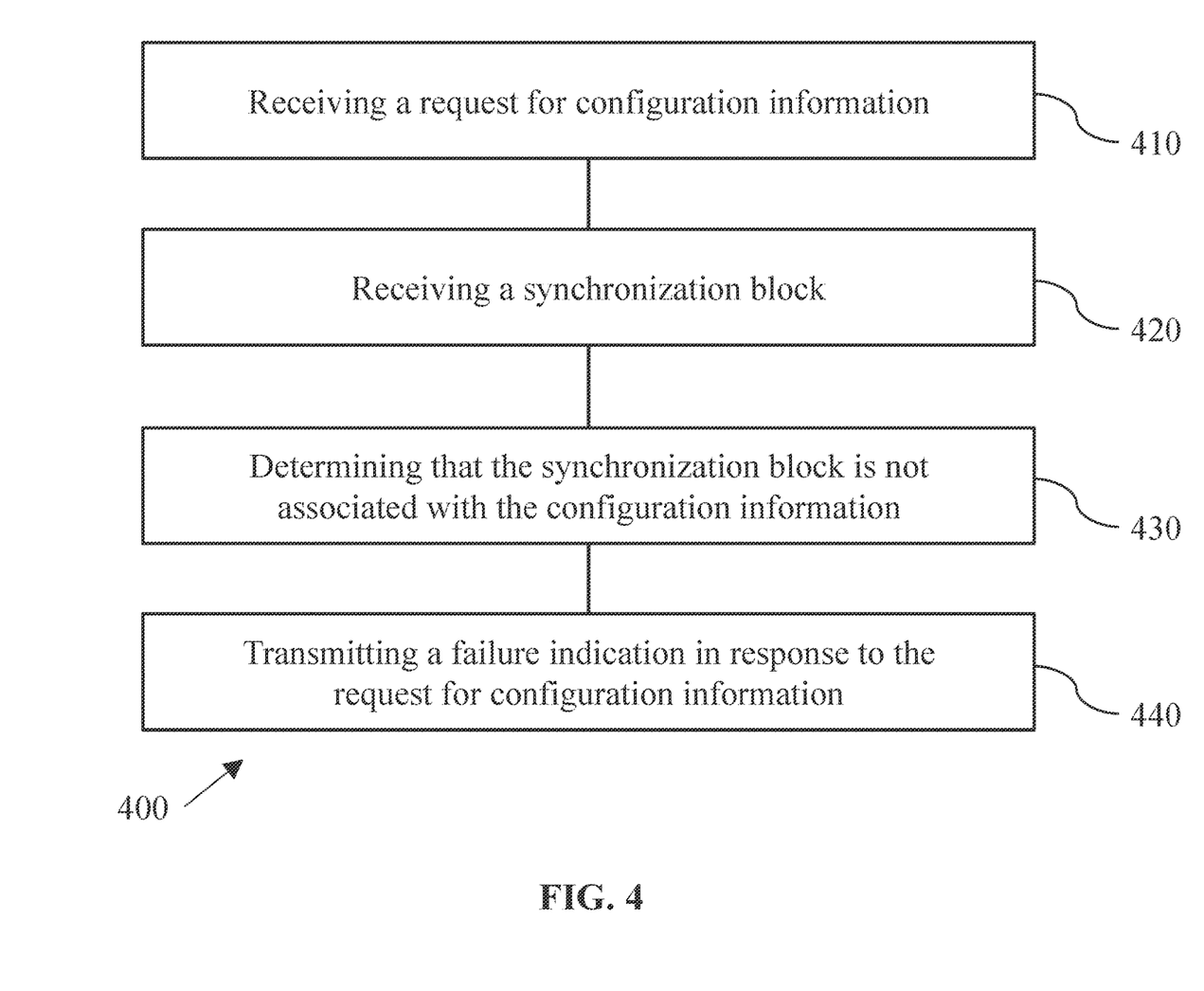
FIG. 4 shows an example of a wireless communication method for cell information acquisition and reporting.

FIG. 4 shows an example of a wireless communication method for cell information acquisition and reporting, which may be implemented at a wireless device. The method 400 includes, at step 410, receiving a request for configuration information. In some embodiments, the method may further include starting a timer upon receiving the request.

The method 400 includes, at step 420, receiving a synchronization block. In some embodiments, the synchronization block may be an SSB.

The method 400 includes, at step 430, determining that the synchronization block is not associated with the configuration information. In some embodiments, determining that lack of association between the synchronization block (e.g. SSB) and the configuration information includes determining that a portion of the synchronization block (e.g. PBCH) excludes scheduling information that enables the wireless device to obtain the configuration information.

The method 400 includes, at step 440, transmitting a failure indication in response to the request for configuration information. In some embodiments, the failure indication may be an explicit 1-bit indication. In other embodiments, the failure indication may be a value corresponding to the synchronization block not being associated with configuration information.

In some embodiments, the failure indication is transmitted after the time has expired.

In some embodiments, the request for configuration information is received from a serving cell, and the configuration information is associated with a target cell. In an example, both the serving and target cells are NR cells. In another example, the serving cell is an LTE cell, and the target cell is an NR cell.

Second Set of Exemplary Embodiments for Cell Information Acquisition and Reporting When the serving network wants to instruct UE to obtain the cell information of target cell, and the target cell is NR cell, the network sends a measurement configuration to the UE. This measurement configuration includes the PCI and frequency of target cell, and its measurement purpose is set to indicate that the UE obtain the cell information of target cell.

In some embodiments, this serving network may be an LTE site or an NR site. For the LTE site, UE is operating in non-standalone mode, wherein it is dual connected to both LTE and NR node. For the NR site, UE is operating in either non-standalone or standalone mode.

Upon receiving the measurement configuration, UE starts a related timer, and attempts to search the target cell based on the indicated frequency and PCI. After synchronizing with the target cell, UE decodes the PBCH which is transmitted in SSB to obtain the scheduling information of RMSI. The content of PBCH indicates that this SSB is not associated with RMSI, but further indicates the configuration information of another SSB. In this case, UE performs RF retuning to the indicated SSB which may located on a different frequency. After successful decoding the PBCH of the indicated SSB, UE obtains the scheduling information of RMSI, then receives and decodes the content of RMSI to obtain the cell information of target cell.

In the exemplary scenario where this procedure succeeds, the UE may send the measurement report to the network by including the cell information of the target cell, or by including the cell information and the configuration of the other indicated SSB of target cell. The configuration of the other indicated SSB mentioned may include the frequency location of the SSB, or an indication of existence of the SSB.

In the exemplary scenario where this procedure fails, e.g. if the UE is unable to perform retuning to the indicated SSB or fails to obtain the cell information based on the indicated SSB, the UE can send measurement report to the network. In an example, the measurement report can now include one or more of (1) an explicit indication to indicate the failure reason is that the requested SSB is not associated with RMSI, (2) a cause value to indicate the failure reason is that the requested SSB is not associated with RMSI, and (3) the configuration of the other indicated SSB, which may be the frequency location of the SSB, the existence indication of the SSB, and/or any other information related to the SSB.

In addition, and in the event of success, UE can send the measurement report right after UE successfully obtains the cell information of target cell. In the event of failure, UE may send the measurement report right after the failure or when the related timer expires.

Case 1. UE is connected to NR cell A, and the NR serving network instructs the UE to obtain the cell information of target NR cell B. The network sends measurement configuration to UE, whose measurement purpose is set to reportCGI, and includes the corresponding frequency of SSB1 and PCI of cell B.

Upon receiving the measurement configuration, UE starts a timer, and attempts to search the SSB1 of target cell B based on the received frequency and PCI of cell B. In the event of a successful search, UE decodes the content of PBCH to obtain the scheduling information of RMSI. In an example, there is no scheduling information of RMSI, which means this SSB is not associated with RMSI, but the content of PBCH indicates the configuration information of another SSB (e.g. SSB2). Then UE performs RF retuning to the indicated SSB2, which may located in a different frequency, after successful decoding the PBCH of the SSB2. UE obtains the scheduling information of RMSI, then receives and decodes the content of RMSI to obtain the cell information of target cell.

After obtaining the cell information of target cell, UE sends measurement report to network by including the cell information of target cell, or by including the cell information and the configuration indication of the SSB2 of target cell.

In some embodiments, the cell information includes one or more of (1) a cell global identifier (CGI) of the target cell, (2) PLMN ID or PLMN ID list of target cell, (3) tracking area code (TAC) of the target cell, and (4) SSB resource timing configuration of target cell.

In some embodiments, the SSB resource timing configuration of target cell includes one or more of time-domain SSB transmission period, SSB transmission offset, SSB transmission duration, and a SSB transmission bitmap. Furthermore, the UE may send this information (or a portion of this information) based on the timing reference of serving cell, or based on the timing reference of target cell.

In some embodiments, the configuration indication of SSB2 can include one or more of the frequency location of the SSB, the existence indication of SSB2, the SSB resource timing configuration of SSB2, and any other information of SSB2.

Case 2. UE is dual connected to both LTE cell A and NR cell B, and the LTE serving network instructs the UE to obtain the cell information of target NR cell C. The LTE network sends measurement configuration to the UE, whose measurement purpose is set to reportCGI, and which includes the corresponding frequency of SSB1 and PCI of NR cell C.

Upon receiving the measurement configuration, UE starts a timer, and attempts to search the SSB1 of target cell C based on the received frequency and PCI of cell C. In the event of a successful search, UE decodes the content of PBCH to obtain the scheduling information of RMSI, but determines that there is no scheduling information of RMSI, which means this SSB is not associated with RMSI. However, the content of PBCH indicates the configuration information of another SSB2. In this case, the UE is unable to perform RF retuning to the indicated SSB2, and sends a measurement report to the LTE serving network, which includes an explicit indication that indicates the request SSB1 is not associated with RMSI. Additionally, the UE may indicate the configuration information of SSB2 which was obtained from PBCH of SSB1. In some embodiments, the configuration information of SSB2 may include one or more of the frequency location of SSB2, the existence information of SSB2, and any other information related to SSB2.

Upon receiving this measurement report, the network is aware of the reason for failure of this attempt based on the received indication and information of SSB2. Based on this, the network will not trigger the reportCGI procedure on the frequency of SSB1 and PCI any more. Instead, the network may directly trigger a reportCGI procedure on the frequency of SSB2 and PCI of target cell C later, since the network has determined that SSB1 and SSB2 belong to the same cell.

Case 3. UE is dual connected to both LTE cell A and NR cell B, and the LTE serving network instructs the UE to obtain the cell information of target NR cell C. The LTE network sends measurement configuration to the UE, whose measurement purpose is set to reportCGI, and which includes the corresponding frequency of SSB1 and PCI of NR cell C.

Upon receiving the measurement configuration, UE starts a timer, and attempts to search the SSB1 of target cell C based on the received frequency and PCI of cell C. In the event of a successful search, UE decodes the content of PBCH to obtain the scheduling information of RMSI, but determines that there is no scheduling information of RMSI, which means this SSB is not associated with RMSI. However, the content of PBCH indicates the configuration information of another SSB2. In this case, the UE is able to successfully perform RF retuning to the indicated SSB2, which may located in a different frequency. After successfully decoding the PBCH of the SSB2, UE obtains the scheduling information of RMSI.

However, UE fails to obtain the cell information of target cell before the timer expires. In this case, UE sends measurement report to the LTE serving network, and includes a cause value which indicates the request SSB1 is not associated with RMSI. The UE may further indicate the configuration information of SSB2 which obtained from PBCH of SSB1. In some embodiments, the configuration information of SSB2 may include one or more of the frequency location of SSB2, the existence information of SSB2, and any other information related to SSB2.

Upon receiving this measurement report, the network is aware of the reason for failure of this attempt based on the received indication and information of SSB2. Based on this, the network may not trigger additional reportCGI procedures on the frequency of SSB1 and PCI any more. Instead, the network can directly trigger a reportCGI procedure on the frequency of SSB2 and PCI of target cell C later, since the network has determined that SSB1 and SSB2 belong to the same cell.

Figure 5:
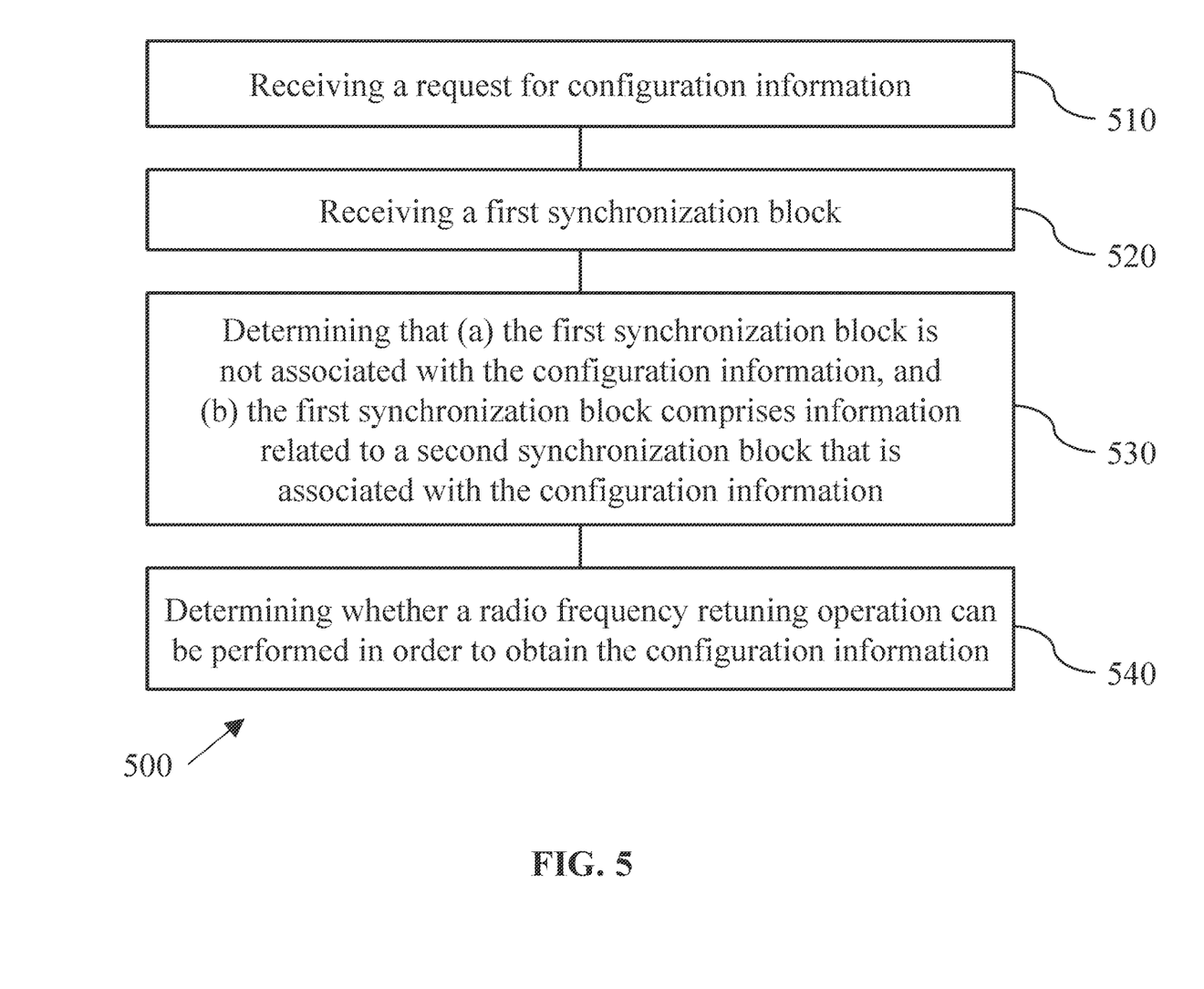
FIG. 5 shows another example of a wireless communication method for cell information acquisition and reporting.

FIG. 5 shows an example of a wireless communication method for cell information acquisition and reporting, which may be implemented at a wireless device. The method 500 includes, at step 510, receiving a request for configuration information.

The method 500 includes, at step 520, receiving a first synchronization block.

The method 500 includes, at step 530, determining that (a) the first synchronization block is not associated with the configuration information, and (b) the first synchronization block comprises information related to a second synchronization block that is associated with the configuration information. In some embodiments, the first and second synchronization blocks are different SSBs, e.g. SSB1 and SSB2.

The method 500 includes, at step 540, determining whether a radio frequency retuning operation can be performed in order to obtain the configuration information. In some embodiments, the wireless device may not be able to retune, and a failure indication is transmitted in response to the request for configuration information. In some embodiments, the failure indication may be an explicit 1-bit indication. In other embodiments, the failure indication may be a value corresponding to the synchronization block not being associated with configuration information.

In some embodiments, the wireless device may perform the retuning operation, and may receive the configuration information by retuning the to a frequency associated with SSB2. The wireless device may then transmit the configuration information and/or the information related to SSB2 to the network node.

In some embodiment, both the serving and target cells are NR cells. In other embodiments, the serving cell is an LTE cell, and the target cell is an NR cell.

Third Set of Exemplary Embodiments for Cell Information Acquisition and Reporting Embodiments of the disclosed technology may combine any one of the third set of exemplary embodiments with any one of the first or second set of exemplary embodiments.

When the serving network wants to instruct UE to obtain the cell information of target cell, as well as the timing difference between serving cell and the target cell (which is an NR cell), the serving network sends the measurement configuration towards the UE. This measurement configuration includes the PCI and frequency of target cell, and its measurement purpose is set to indicate the UE to obtain the cell information of target cell. Furthermore, the network may enable the timing difference measurement between serving cell and target cell in this measurement configuration.

In some embodiments, this serving network may be an LTE site or an NR site. For the LTE site, UE is operating in non-standalone mode, wherein it is dual connected to both LTE and NR node. For the NR site, UE is operating in either non-standalone or standalone mode.

In some embodiments, and with regard to the measurement object configuration of target cell in the measurement configuration message, the network may or may not indicate the SSB resource timing configuration of cell B. In an example, the SSB resource timing configuration includes the SSB measurement timing configuration (SMTC).

Upon receiving the measurement configuration, UE starts the related timer, and attempts to search the target cell based on the indicated frequency and PCI. If the SSB resource timing configuration is not received, UE performs a blind search for the target cell in the time domain. After synchronizing with the target cell, UE attempts to obtain the cell information of target cell. In some embodiments, the cell information includes CGI, PLMN ID, TAC, etc. In addition, the UE may calculate the timing difference between serving cell and target cell. In some embodiments, the timing difference may include an SFN offset, a frame boundary offset and a subframe boundary offset between the serving cell and the target cell.

In the exemplary case where UE has succeeded in obtaining the cell information of target cell and has succeeded in calculating the timing difference measurement results, the UE may send a measurement report to the network, which includes both cell information of the target cell and timing difference measurement results.

In the exemplary case where UE has succeeded in obtaining the cell information of target cell, but has failed in calculating the timing difference measurement results, the UE may send a measurement report, which includes only cell information of the target cell.

In the exemplary case where UE has failed in obtaining the cell information of target cell, but succeeded in calculating the timing difference measurement results, the UE may send a measurement report to the network, which includes only the timing difference measurement results. In another example, the UE may send the measurement report, which includes neither cell information nor timing difference measurement results, to the network.

In the exemplary case where UE has failed in obtaining the cell information of target cell, and has failed in calculating the timing difference measurement results, the UE may send a measurement report to network, which excludes the cell information and the timing difference measurement results.

In each of the aforementioned scenarios, and in some embodiments, the UE may send the measurement report right after UE successfully obtains the cell information of target cell. In other embodiments, the UE may send the measurement report right after the failure happens or after the related timer expires.

After receiving this measurement report, if timing difference between measurement results between serving cell and target cell is included, the network may adjust the SSB measurement timing configuration of the target cell's frequency based on the timing difference results received from UE. In addition, the network may adjust the CSI-RS resource configuration of target cell C's frequency based on the timing difference results as well. The network may then send the adjusted configuration of target cell's frequency to UEs within the serving cell.

Case 1. UE is connected to NR cell A, and the NR serving network instructs the UE to obtain the cell information of target NR cell B and the timing difference between NR cell A and cell B. The cell A network sends a measurement configuration, with the measurement purpose set to reportCGI, to the UE. Additionally, to enable the timing difference measurement, the measurement configuration indicates the corresponding frequency and PCI of cell B. But the SSB resource timing configuration of cell B is not included in the measurement configuration.

Upon receiving the measurement configuration, UE starts a timer, and attempts to search the SSB of target cell B based on the received frequency and PCI of cell B. The UE has to search cell B in the time domain since the SSB resource timing configuration is not received by UE. After synchronizing with the target cell B, but without obtaining the cell information (e.g. CGI, PLMN ID list, TAC, etc.) of target cell B, the UE may obtain the SFN and frame information of target cell B, and then calculate the timing difference between serving cell A and target cell B. In some embodiments, the timing difference may include one or more of an SFN offset, a frame boundary offset and a subframe boundary offset between the serving cell and the target cell.

After the UE succeeds in obtaining the cell information and calculating the timing difference results, the UE may immediately send the measurement report message to network by including the cell information of cell B and timing difference results between cell A and cell B.

After receiving this measurement report, the network is aware of the cell information of target cell B, as well as the timing difference between cell A and cell B. Thus, the network may obtain the SSB resource timing configuration of target cell B, and adjust the SSB measurement timing configuration of target cell B's frequency based on the timing difference results received from UE. In addition, the network may adjust the CSI-RS resource configuration of target cell C's frequency, and send the adjusted configuration of cell B's frequency towards UEs within cell A.

Case 2. UE is dual connected to both LTE cell A and NR cell B, and the LTE serving network instructs the UE to obtain the cell information of target NR cell C and the timing difference between LTE cell A and NR cell C. The LTE cell A network sends a measurement configuration to the UE, whose measurement purpose is set to reportCGI, and to enable the timing difference measurement, indicates the corresponding frequency and PCI of cell C. It also includes the SSB resource timing configuration of cell C.

Upon receiving the measurement configuration, UE starts a timer, and attempts to search the SSB of target cell C based on the received frequency and PCI of cell B. After synchronizing with the target cell C, but without obtaining the cell information (e.g. CGI, PLMN ID list, TAC, etc.) of target cell C, UE obtains the SFN and frame information of target cell C, and calculates the timing difference between serving cell A and target cell C. In some embodiments, the timing difference may include one or more of an SFN offset, a frame boundary offset and a subframe boundary offset between the serving cell and the target cell.

However, in this case, the UE failed in obtaining the cell information but succeeded in calculating the timing difference results before the timer expires. Thus, when the timer expires, UE sends the measurement report message to network, and which only includes the timing difference measurement results between LTE cell A and NR cell C.

After receiving this measurement report, the network may still be unaware of the cell information of target cell C, but by receiving the timing difference between cell A and cell C, the network may adjust the SSB measurement timing configuration of target cell C's frequency based on the timing difference results received from UE. In addition, the network may adjust the CSI-RS resource configuration of target cell C's frequency, and send the adjusted configurations of cell C's frequency towards UEs within cell A.

Figure 6:
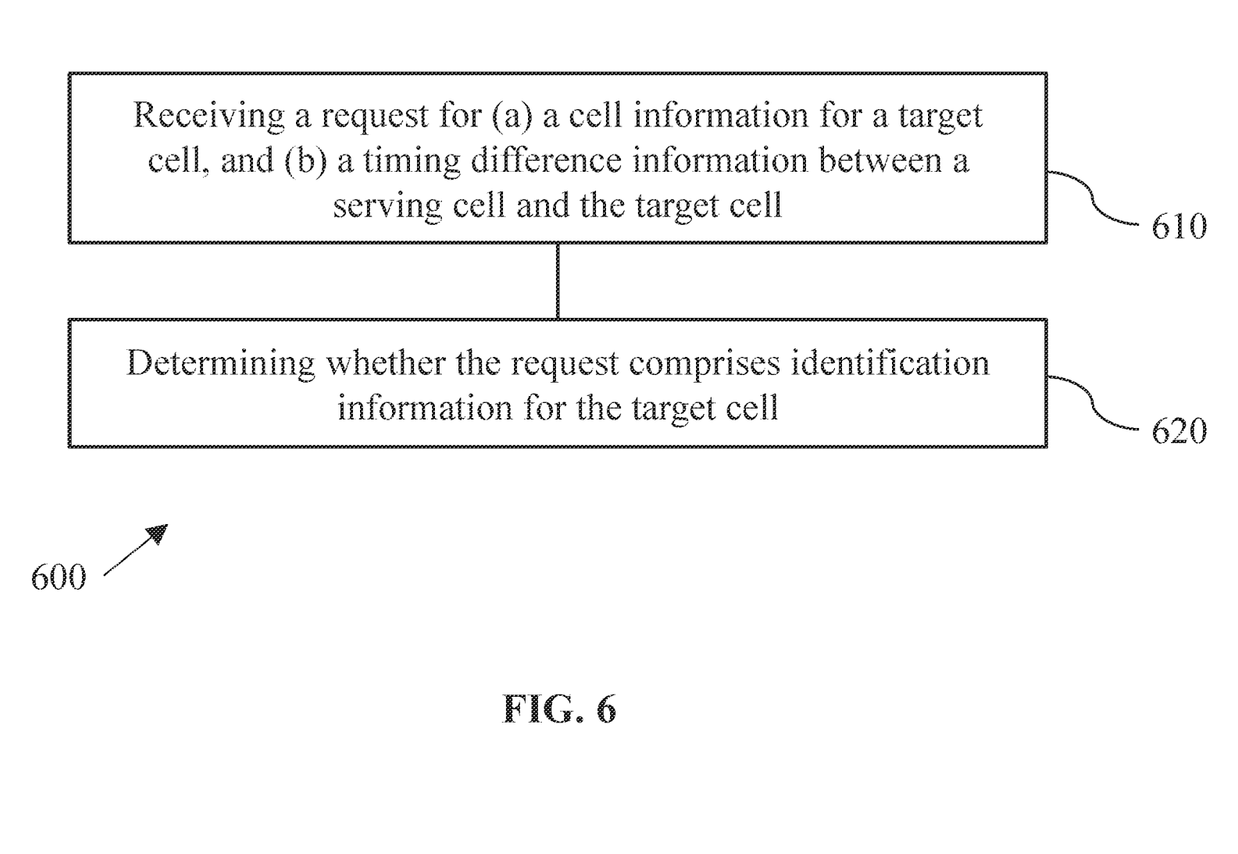
FIG. 6 shows yet another example of a wireless communication method for cell information acquisition and reporting.

FIG. 6 shows an example of a wireless communication method for cell information acquisition and reporting, which may be implemented at a wireless device. The method 600 includes, at step 610, receiving a request for (a) a cell information for a target cell, and (b) a timing difference information between a serving cell and the target cell.

The method 600 includes, at step 620, determining whether the request comprises identification information for the target cell. In some embodiments, the identification information comprises SSB (synchronization signal/physical broadcast channel block) measurement timing configuration (SMTC) information. In an example, the SMTC may include window information, which includes one or more of a time-domain period, a time-domain offset and a time-domain duration.

Figure 7:
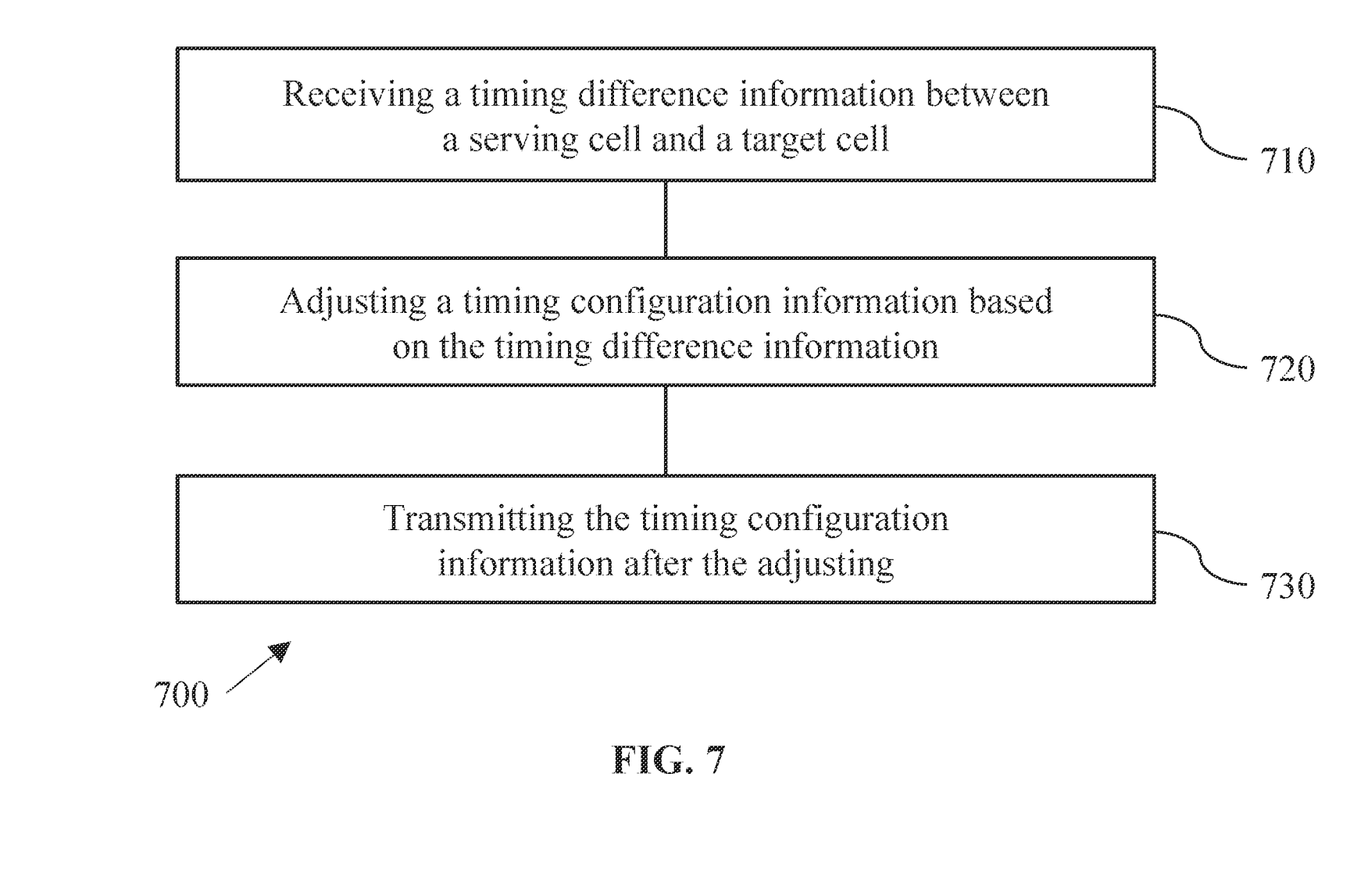
FIG. 7 shows yet another example of a wireless communication method for cell information acquisition and reporting.

FIG. 7 shows an example of a wireless communication method for cell information acquisition and reporting, which may be implemented at a network node. The method 700 includes, at step 710, receiving a timing difference information between a serving cell and a target cell. In some embodiments, the timing difference information includes one or more of a system frame number (SFN) offset, a frame boundary offset and a subframe boundary offset between the serving cell and the target cell.

The method 700 includes, at step 720, adjusting a timing configuration information based on the timing difference information. In some embodiments, the timing configuration information corresponds to SSB (synchronization signal/physical broadcast channel block) measurement timing configuration (SMTC) information. In an example, the SMTC information includes window information, which includes one or more of a time-domain period, a time-domain offset and a time-domain duration. In some embodiments, the timing configuration information may include a frequency or a channel state information-reference signal (CSI-RS) of the target cell.

The method 700 includes, at step 730, transmitting the timing configuration information after the adjusting.

Figure 8:
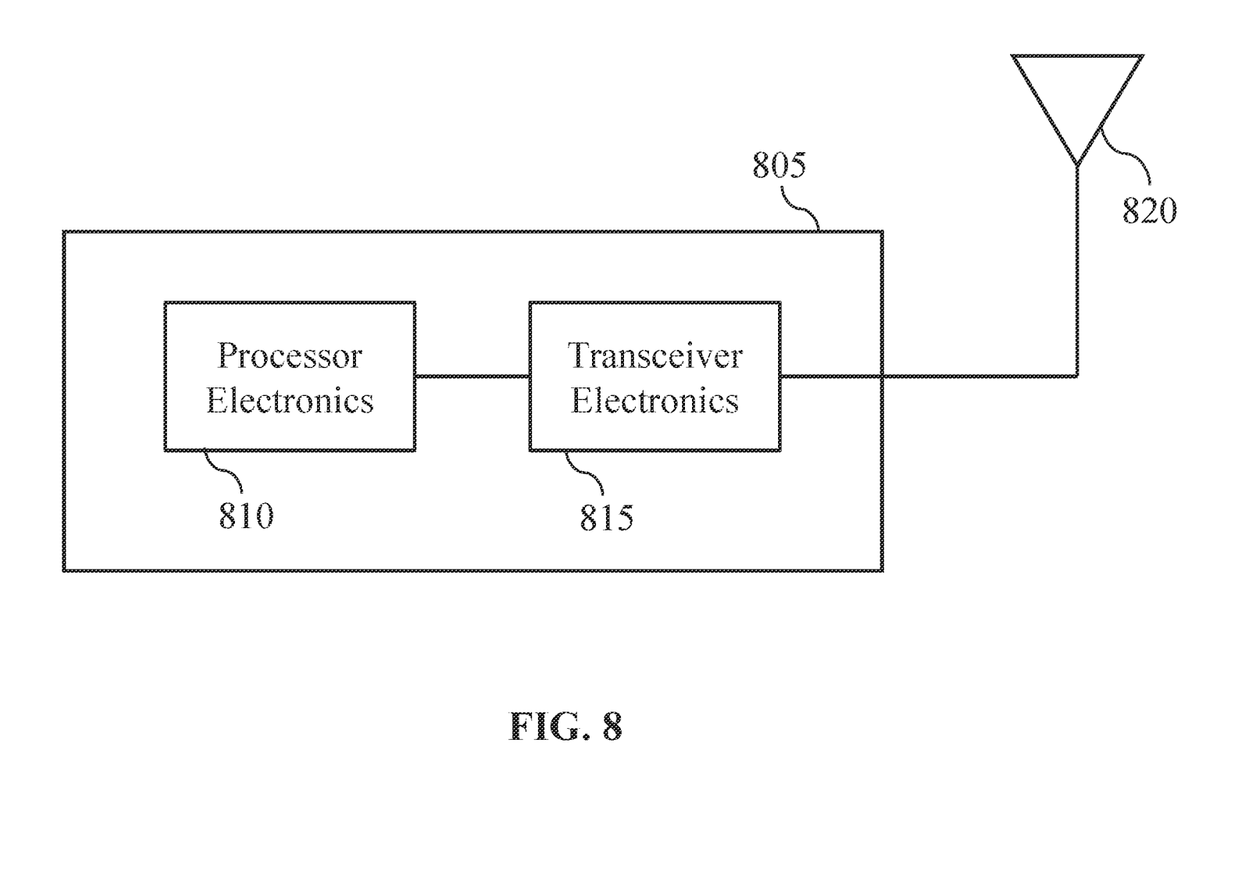
FIG. 8 is a block diagram representation of a portion of an apparatus that may implement a method or technique described in this patent document.

FIG. 8 is a block diagram of an example apparatus that may implement a method or technique described in this documents (e.g. methods 400-700). A apparatus 805, such as a base station or a wireless device (or UE), can include processor electronics 810 such as a microprocessor that implements one or more of the techniques presented in this document. The apparatus 805 can include transceiver electronics 815 to send and/or receive wireless signals over one or more communication interfaces such as antenna(s) 820. The apparatus 805 can include other communication interfaces for transmitting and receiving data. Apparatus 805 can include one or more memories (not explicitly shown) configured to store information such as data and/or instructions. In some implementations, the processor electronics 810 can include at least a portion of the transceiver electronics 815. In some embodiments, at least some of the disclosed techniques, modules or functions are implemented using the apparatus 805.

It is intended that the specification, together with the drawings, be considered exemplary only, where exemplary means an example and, unless otherwise stated, does not imply an ideal or a preferred embodiment. As used herein, the singular forms "a", "an" and "the" are intended to include the plural forms as well, unless the context clearly indicates otherwise. Additionally, the use of "or" is intended to include "and/or", unless the context clearly indicates otherwise.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described and other implementations, enhancements and variations can be made based on what is described and illustrated in this disclosure.

What is claimed is:

1. A method for wireless communication, comprising:
receiving a request for configuration information;
receiving a first synchronization block;
determining that the first synchronization block is not associated with the configuration information, and that the first synchronization block comprises information related to a second synchronization block that is associated with the configuration information;
determining whether to perform a radio frequency retuning operation to obtain the configuration information;
determining that the radio frequency retuning operation cannot be performed; and
transmitting a failure indication in response to the request for configuration information and in response to the determining that the radio frequency retuning operation cannot be performed.

2. The method of claim 1, wherein the failure indication is an explicit 1-bit indication.

3. The method of claim 1, wherein the failure indication comprises a value corresponding to the first synchronization block not being associated with the configuration information.

4. The method of claim 1, further comprising:
starting a timer in response to receiving the request, wherein the transmitting the failure indication is subsequent to an expiration of the timer.

5. The method of claim 1, further comprising:
determining that the radio frequency retuning operation is to be performed;
receiving the configuration information based on retuning to a frequency associated with the second synchronization block; and
transmitting, to a serving cell, the configuration information in response to the request for configuration information.

6. The method of claim 1, further comprising:
transmitting, to a serving cell, the information related to the second synchronization block in response to the request for configuration information.

7. The method of claim 6, wherein the information related to the second synchronization block comprises one or more of frequency information, a time-domain period, a time-domain offset, and a time-domain transmission bitmap.

8. The method of claim 1, wherein the request for configuration information is received from a serving cell, and wherein the configuration information is associated with a target cell.

9. The method of claim 8, wherein the serving cell is a New Radio (NR) cell, and wherein the target cell is another NR cell.

10. The method of claim 8, wherein the serving cell is a Long Term Evolution (LTE) cell, and wherein the target cell is a New Radio (NR) cell.

11. A wireless communications apparatus comprising a processor, wherein the processor is configured to implement a method, comprising:
receive a request for configuration information;
receive a first synchronization block;
determine that the first synchronization block is not associated with the configuration information, and that the first synchronization block comprises information related to a second synchronization block that is associated with the configuration information;
determine whether to perform a radio frequency retuning operation to obtain the configuration information;
determine that the radio frequency retuning operation cannot be performed; and
transmit a failure indication in response to the request for configuration information and in response to a determination that the radio frequency retuning operation cannot be performed.

12. The wireless communications apparatus of claim 11, wherein the failure indication is an explicit 1-bit indication.

13. The wireless communications apparatus of claim 11, wherein the failure indication comprises a value corresponding to the first synchronization block not being associated with the configuration information.

14. The wireless communications apparatus of claim 11, wherein the processor is further configured to:
start a timer in response to receiving the request, wherein the transmit the failure indication is subsequent to an expiration of the timer.

15. The wireless communications apparatus of claim 11, wherein the processor is further configured to:
determine that the radio frequency retuning operation is to be performed;
receive the configuration information based on retuning to a frequency associated with the second synchronization block; and
transmit, to a serving cell, the configuration information in response to the request for configuration information.

16. The wireless communications apparatus of claim 11, wherein the processor is further configured to:
transmit, to a serving cell, the information related to the second synchronization block in response to the request for configuration information.

17. The wireless communications apparatus of claim 16, wherein the information related to the second synchronization block comprises one or more of frequency information, a time-domain period, a time-domain offset, and a time-domain transmission bitmap.

18. The wireless communications apparatus of claim 11, wherein the request for configuration information is received from a serving cell, and wherein the configuration information is associated with a target cell.

19. The wireless communications apparatus of claim 18, wherein the serving cell is a New Radio (NR) cell, and wherein the target cell is another NR cell.

20. The wireless communications apparatus of claim 18, wherein the serving cell is a Long Term Evolution (LTE) cell, and wherein the target cell is a New Radio (NR) cell.

\* \* \* \* \*